(12) United States Patent
BuAbbud

(10) Patent No.: US 6,496,639 B1
(45) Date of Patent: Dec. 17, 2002

(54) METHOD AND APPARATUS FOR UPGRADING AN OPTICAL FIBER COMMUNICATION SYSTEM

(75) Inventor: George H. BuAbbud, South Lake, TX (US)

(73) Assignee: Marconi Communications, Inc., Cleveland, OH (US)

(*) Notice: Subject to any disclaimer, the term of this patent is extended or adjusted under 35 U.S.C. 154(b) by 0 days.

(21) Appl. No.: 09/249,055

(22) Filed: Feb. 12, 1999

(51) Int. Cl.[7] .................................................. G02B 6/00
(52) U.S. Cl. ......................... 385/135; 359/125; 359/167
(58) Field of Search ................................. 359/113, 124, 359/125, 167, 173; 385/134, 135

(56) References Cited

U.S. PATENT DOCUMENTS

| | | | |
|---|---|---|---|
| 5,075,791 A | | 12/1991 | Hastings ..................... 359/135 |
| 5,408,350 A | * | 4/1995 | Perrier et al. ................ 359/168 |
| 5,913,006 A | * | 6/1999 | Summach .................... 384/134 |
| 6,031,645 A | * | 2/2000 | Ichikawa ..................... 359/113 |
| 6,278,829 B1 | * | 8/2001 | BuAbbud et al. ........... 385/135 |

FOREIGN PATENT DOCUMENTS

DE 19714650 4/1997 ............ H04J/14/02

OTHER PUBLICATIONS

M. Suyama, T. Chikama, H. Onaka, T. Kiyonaga, H. Kuwahara; *Implementation Strategy of Optical Coherent Technology Suitable for Subscriber Networks*, Globecom 1987, pp. 689–693.

U. Hibk, Th. Hermes, J. Saniter, F–J. Westphal; *High Capacity WDM Overlay on a Passive Optical Network*, Electronics Letters, Nov. 7, 1996, vol. 32, No. 23, pp. 2762–2763.

* cited by examiner

Primary Examiner—Kinfe-Michael Negash
(74) Attorney, Agent, or Firm—Jones, Day, Reavis & Pogue

(57) ABSTRACT

A method and apparatus for low cost upgrading on demand of an optical fiber communication system from a single communication channel at one frequency to two communication channel systems at two different frequencies.

15 Claims, 8 Drawing Sheets

METHOD AND APPARATUS FOR UPGRADING AN OPTICAL FIBER COMMUNICATION SYSTEM

BACKGROUND OF THE INVENTION

1. Field of the Invention

The present invention relates to methods and apparatus for carrying on simultaneous communications over a single optical fiber by using two different operating frequencies, and more specifically to methods and apparatus for converting or upgrading a multiplicity of single optical fibers extending from a distribution cabinet to a multiplicity of user stations or first locations which individual optical fibers of said multiplicity initially provided a single communication channel to the multiplicity of remote locations and after upgrading those same optical fibers provide two communication channels operating at different frequencies.

2. Description of Related Art Including Information Disclosed Under 37 CFR 1.97 AND 1.98

The telecommunications industry is using more and more optical or light fibers in lieu of copper wire. Optical fibers have an extremely high bandwidth thereby allowing significantly more information than can be carried by a copper wire.

Of course, modern telephone systems require bidirectional communications where each station on a communication channel can both transmit and receive. This is true, of course, whether using electrical wiring or optical fibers as the transmission medium. Early telephone communication systems solved this need by simply providing separate copper wires for carrying the communications in each direction. Some early attempts at using optical fibers as a transmission medium followed this example and also used two different optical fibers such as optical fibers 10 and 10A in the prior art FIG. 1 for carrying the communications in each direction. As shown, in the prior art FIG. 1, fiber 10 is connected by an optical coupler 12 to an LED (light-emitting diode) 14 at one end and by optical coupler 16 to a PD (photodetection diode) 18 at the other end. Similarly, but in reverse, fiber 10A is connected by an optical coupler 16A to PD 18 at one end and by optical coupler 12A to LED 14 at the other end.

However, because of extremely high bandwidths available for use by an optical fiber, a single fiber is quite capable of carrying communications in both directions. One technique is WDM (wavelength divisional multiplexing) which is shown in the prior art FIG. 2 and uses different wavelenghts for each direction of travel. Components in FIG. 2 and subsequent figures which operate the same as shown in FIG. 1 carry the same reference numbers. In the embodiment shown in FIG. 2, a central office 20 is connected to an RT (remote terminal) 22 by a single optical fiber 10B. As shown, the central office includes a light-emitting diode 14 optically connected to fiber optics 10 by optical coupler 12 for converting electrical signals to optical signals and a photodetection diode 18 optically connected to optical fiber 10B by a coupler 16B for converting optical signals to electrical signals. The fiber optics 10 and fiber optics 10A are each connected to a wavelength division multiplexer 24 which in turn is connected by optical coupler 26 to optical fiber 10B. This arrangement is duplicated at the RT 22 by light-emitting diode 14A, photodetection diode 18A, and wavelength division multiplexer 24A. It will, of course, be appreciated that although the figure is shown as providing communications between a central office 20 (station 1) and a remote terminal office 22 (station 2), the communications system could be used for providing communications between any two types of stations such as, for example, two central offices, two remote terminal offices, or between a remote office and an individual user's location, etc. A typical communications system using an LED and a PD with a single optical fiber is disclosed in U.S. Pat. No. 5,075,791 entitled "Method and Apparatus for Achieving Two-Way Long-Range Communication Over an Optical Fiber", issued to Mark W. Hastings, and incorporated in its entirety hereby by reference.

Yet another and simpler technique for using a single optical fiber 10C for telephone systems is illustrated in the prior art FIG. 3. The illustrated figure is referred to as TCM (time compression multiplexing) and is sometimes referred to as a "ping-pong" system. The system operates at a single frequency and uses a single optical fiber 10 and a single diode 30 and 30A at each end connected by optical couplers 32 and 32A, respectively, for both converting electrical signals to optical signals and for receiving optical signals and converting those optical signals to electrical signals. TCM systems have the obvious advantage of requiring fewer components.

However, as mentioned above, optical fibers have extremely high bandwidths and use of an optical fiber for a single ping-pong telephone channel is a very ineffective use of the fiber and, in fact, the available bandwidth of an optical fiber makes it possible to use a transmission technique such as TCM or ping-pong at one frequency and then by the use of WDM technology to use another technique at a second frequency. Of course, where optical transmission systems such as a ping-pong or TCM system has been installed, it would not be desirable to disrupt the operation of such systems. Further, once a ping-pong fiber-optic telephone system is installed, removal and replacement with a new system would normally be prohibitive from a cost point of view. Therefore, it would be advantageous to be able to upgrade the existing TCM or ping-pong fiber-optic telephone system to also carry a second communication channel at another frequency.

SUMMARY OF THE INVENTION

It is an object of this invention to provide methods and apparatus for upgrading a communication transmission system initially providing a communication channel operating at one frequency so that it can provide two communication channels operating at different frequencies.

It is another object of the invention to provide a method and apparatus to upgrade a communication transmission system without extensive rewiring of optical fibers.

It is still another object of the invention to provide methods and apparatus to upgrade a communication transmission system with minimal addition of new components.

It is yet another object of the invention to allow upgrading of a optical fiber communication transmission system to occur on an on-demand-basis.

The present invention accomplishes these and other objects in distribution apparatus of an optical fiber communication system for carrying information between a multiplicity of homes or first locations and a second location such as a remote terminal. The optical fiber communication system includes a multiplicity of optical fibers which extend one each between the multiplicity of homes or first locations and terminate at the distribution apparatus with a first Readily Releasable Optical Connector mounted at spaced locations on a first distribution panel. The communication system also includes a multiplicity of optical fibers extending between a second location and the distribution apparatus. This second multiplicity of optical fibers which extend between the distribution apparatus and the second location terminate at the distribution apparatus with a second Readily Releasable Optical Connector, and each one of the second Readily Releasable Optical Connectors being connected one each to one of the first Readily Releasable Optical Connectors on said first distribution panel. The upgrade according to the present invention comprises a multiplicity of combining units which combine the optical signals carrying information on two different optical fibers to produce an output on a single optical fiber which carries the two communication channels at different frequencies. Therefore, each one of a multiplicity of combining units is connected to an optical fiber carrying information at a first frequency, and an optical fiber carrying information at a second frequency as an output. From the combining unit, there is provided another optical fiber carrying information at both the first and second frequencies. This optical fiber carrying information at both frequencies terminates with a first Readily Releasable Optical Connector mounted at spaced locations on a second distribution panel. When these combining units are initially received and mounted in the distribution apparatus, the second Readily Releasable Optical Connector of each combining unit is connected to its corresponding first Readily Releasable Optical Connector from that same combining unit. Upon receiving a request from a customer wanting a second communications channel in addition to the existing communication channel operating as a TCM (time compression multiplexing) system, such as a ping-pong system, the request is simply carried out by the present invention by swapping optical fibers connected to the first and second distribution panels. For example, a selected one of the second Readily Releasable Optical Connector is disconnected from its corresponding first Readily Releasable Optical Connector mounted on the first distribution panel, and a selected one of a second Readily Releasable Optical Connector is disconnected from its corresponding first Readily Releasable Optical Connector mounting on the second distribution panel. The disconnected second Readily Releasable Optical Connector on the first panel is then reconnected to the vacated first Readily Releasable Optical Connector on the second panel and likewise the disconnected second Readily Releasable Optical Connector from the second panel is reconnected to the vacated first Readily Releasable Optical Connector on the first panel.

Thus, there is provided an optical fiber communication channel between the selected home or first location and a second location such as a remote terminal, a central office, or the like which operates at a first frequency and a second communication channel between the selected first location and a third location. The second communication channel operates at a second frequency. When other requests or demands from other subscribers or customers desire to upgrade their communication systems to include both channels, the step of disconnecting and connecting other ones of the first and second Readily Releasable Optical Connectors from a first and second distribution channels is repeated. By using this system, upgrading the systems on customer demand is easy while, at the same time, by maintaining the connectors of each individual combining unit connected and looped on themselves when not used to upgrade a system, helps avoid expensive fiber-optic terminals to prevent reflection back into the unused fibers. It is not unusual when upgrading a system such as described above that a single optical fiber from the third location will be provided to the distribution apparatus rather than a multiplicity of single individual fibers to each optical combining unit. Therefore, in embodiment, where a single optical fiber carrying the information at the second frequency is provided between the third location and the distribution panel, the apparatus further includes a splitter connected to the single optical fiber at its input. A multiplicity of optical fibers at the output of the splitter then carries the information at a second frequency to the multiplicity of individual combining units. According to one embodiment, the information carried at the second frequency from the third location may be high-definition digital TV signals and consequently the direction of travel is in one direction only, i.e., from the third location to the individual homes or multiplicity of first locations.

BRIEF DESCRIPTION OF THE DRAWINGS

These and other features of the present invention will be more fully disclosed when taken in conjunction with the following Detailed Description of the Preferred Embodiment(s) in which like numerals represent like elements and in which.

DETAILED DESCRIPTION OF THE PREFERRED EMBODIMENT(S)

Figure 1:
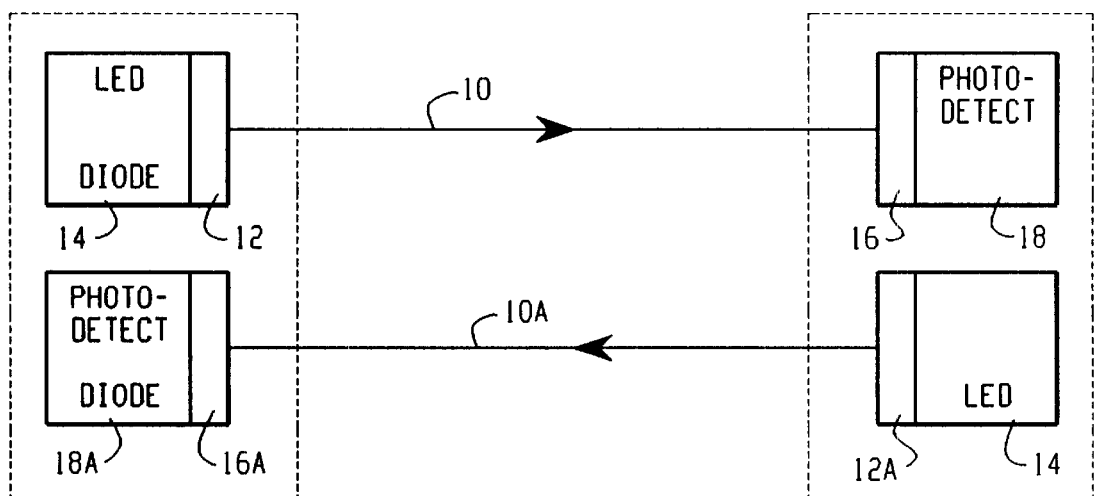
FIG. 1 is a block diagram of a prior art fiber optical communication system using two fibers to obtain bidirectional communication.
Figure 2:
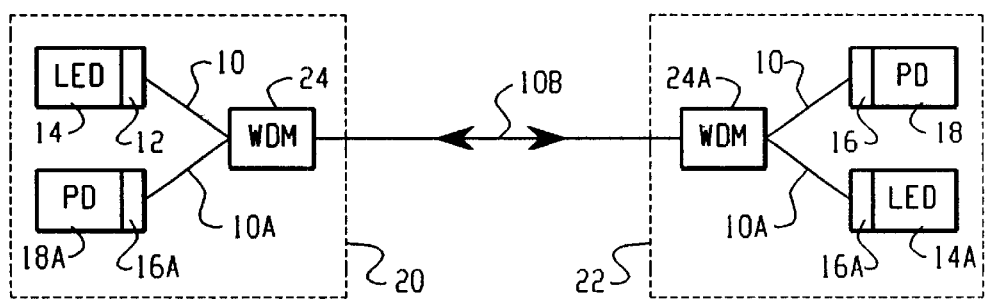
FIG. 2 is a prior art block diagram of a fiber-optic communication system using a single transmission fiber having a light-emitting diode and a photodetection diode at each end of the fiber.
Figure 3:
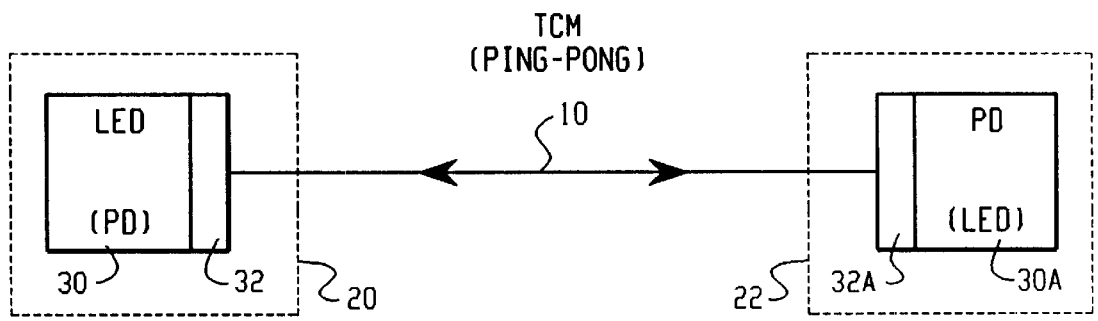
FIG. 3 is a prior art block diagram of a fiber optical communication system using a single fiber and a single transmit/receive diode at each end suitable for TCM or ping-pong types of transmission.
Figure 4:
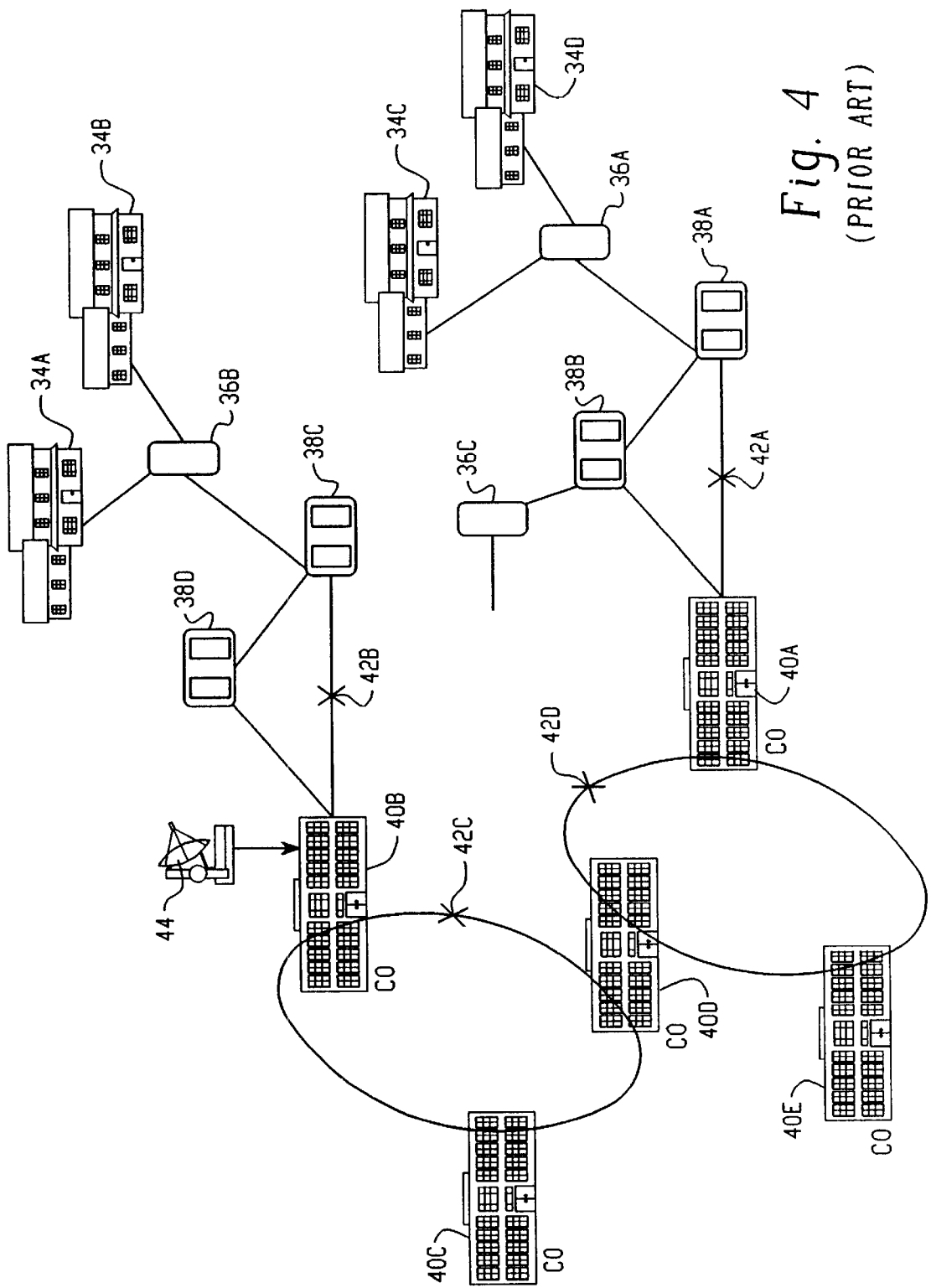
FIG. 4 is a prior art pictorial layout of a communication system providing a single type of communication channel operating at a first frequency and provided to a multiplicity of end users.

Referring now to FIG. 4, there is shown a typical optical communication system which connects individual homes such as 34A, 34B, 34C, and 34D. As shown, the homes are connected to curbside distribution boxes such as 36A, 36B, and 36C which typically will provide communication channels to eight homes each. Depending upon the sophistication of the system and the capabilities of the individual homes, the connection between the curbside distribution boxes 36A, 36B, and 36C may be copper or optical fibers. The curbside boxes 36A, 36B, and 36C are in turn connected to RTs (remote terminals) such as RTs 38A, 38B, 38C, and 38D. It will be appreciated that although no homes are shown connected to the curbside box 36C and that there are no curbside boxes connected to remote terminal 38D, these have been left out only for simplification. Redundancy is also illustrated in the diagram in that not only are the RTs 38A and 38C connected to central offices 40A and 40B, RT 38A is also connected to RTD 38B which, in turn, is connected to central office 40A. Thus, if a line breaks on the optical fiber between central office 40A and remote terminal 38A as indicated by the X 42, service to the customers provided through RT 38A is still available from the central office 40A by going from central office 40A to remote terminal 38B and then to remote terminal 38A. A similar arrangement is shown being in place for remote terminals 38C and 38D communicating with central office 40B. Thus, it is seen that a communication path exists between home 34A through curbside terminal 36B, remote terminal 38C, central office 40B, central office 40D, central office 40A, remote terminal 38A, curbside terminal 36A, to home 34D. However, if several cable breaks were to occur at the same time at locations such as indicated by the X's 42A, 42B, 42C, and 42D, which a system might experience during the occurrence of a natural disaster, communication from home 34A to home 34D would still be possible by taking an alternate route from remote terminal 38C, namely, 38C to 38D then to the central offices 40B, 40C, 40D, 40E, and 40A. From central office 40A, as was discussed earlier, the communication channel could then go to RT 38B, then to RT 38A. In the embodiment shown, central office 40B also includes an antenna 44 for receiving telephone communications or other types of communications from a satellite. Also as shown in the prior art communication system of FIG. 4, the various central offices, remote terminals, curbside terminals, and the individual homes are all shown as being connected by a single solid dark line representing a communication channel at a particular frequency such as, for example, a TCM or ping-pong system operating at 1310 MHZ.

Figure 5:
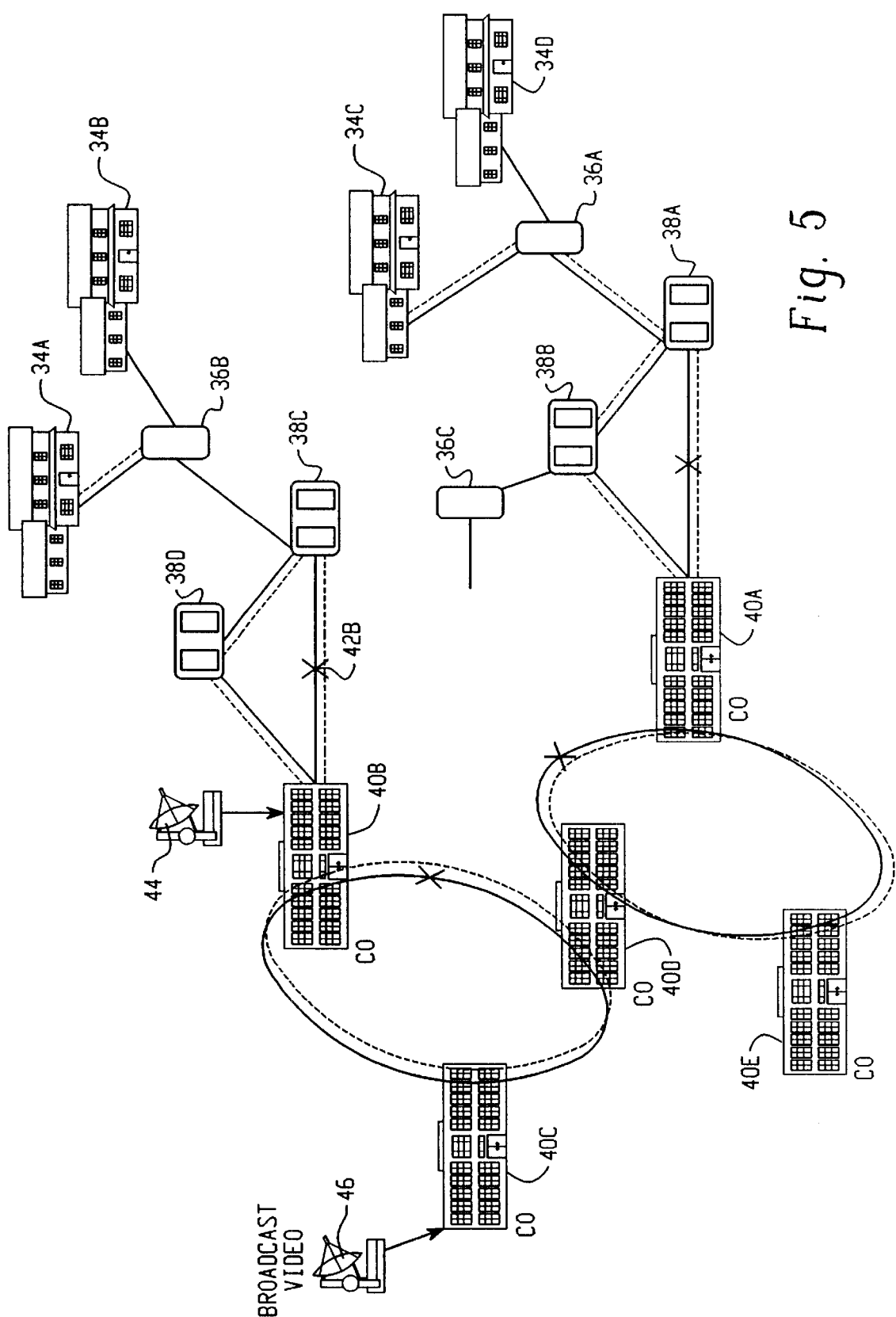
FIG. 5 is a pictorial layout of a communication system providing two communication channels from different sources and operating at different frequencies and provided to a multiplicity of end users.

Referring now to FIG. 5, there is a pictorial illustration of the communication system of FIG. 4 after it has been upgraded to carry a second communication channel at another frequency such as, for example, 1510 MHZ. The same reference numbers for like components as used in FIG. 4 are also used in FIG. 5. As shown in FIG. 5, the system now includes an additional broadcast video 46 which provides information at, for example 1510 MHZ to central office 40C. Then as shown in the diagram in addition to the solid lines running between the various central offices, remote terminals, and homes and carrying the frequency of 1310 as discussed with respect to FIG. 4, there are also dashed lines indicating the presence of a communication channel carrying information at the 1550 frequency. Referring now specifically to the remote terminal 38A, the curbside distribution 36A, and the two homes 34C and 34D, a discussion is now provided covering the techniques of this invention.

Figure 6:
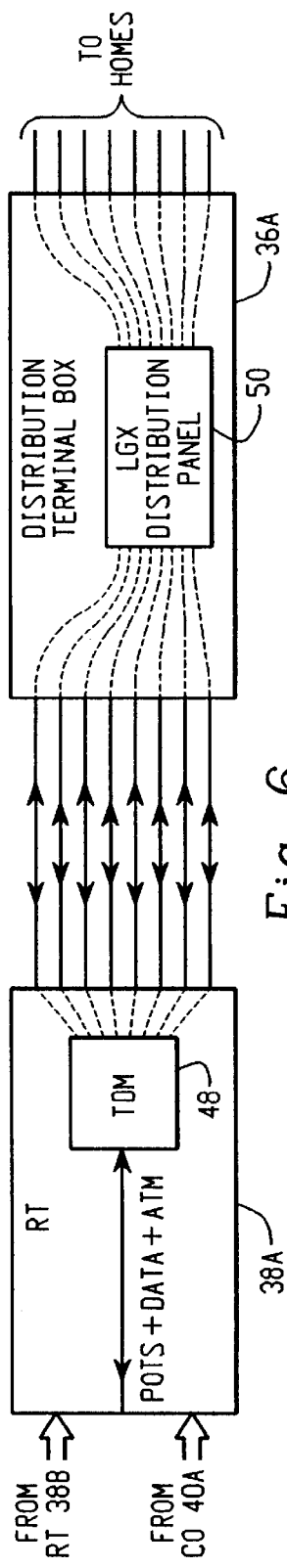
FIG. 6 is a schematic diagram of a portion of a prior art FTTH (fiber-to-the-home) communication system operating at a first frequency.

As shown in FIG. 6, a communication channel exists as discussed above from the RT 38A to the curbside distribution apparatus 36A: As shown, this communication service will be composed typically of POTS (plain old telephone service) plus data for a computer and ATM (asynchronous transfer mode) data for TVs etc. In the example shown the input is to a time division multiplexing apparatus 48 which provides a multiplicity of optical fibers to the distribution terminal box 36A. The existing distribution terminal box 36A receives the multiplicity of fibers at an LGX (light guide cross-connect) distribution panel 50 where they are then connected and forwarded to the homes such as homes 34C and 34D as required. When the system is upgraded as shown in FIG. 5 to also include a second communication channel network operating at 1550 MHZ, it will be appreciated that it would be desirable to be able to upgrade the individual homes on an as-demand-basis without having to replace existing equipment and components.

Figure 7:
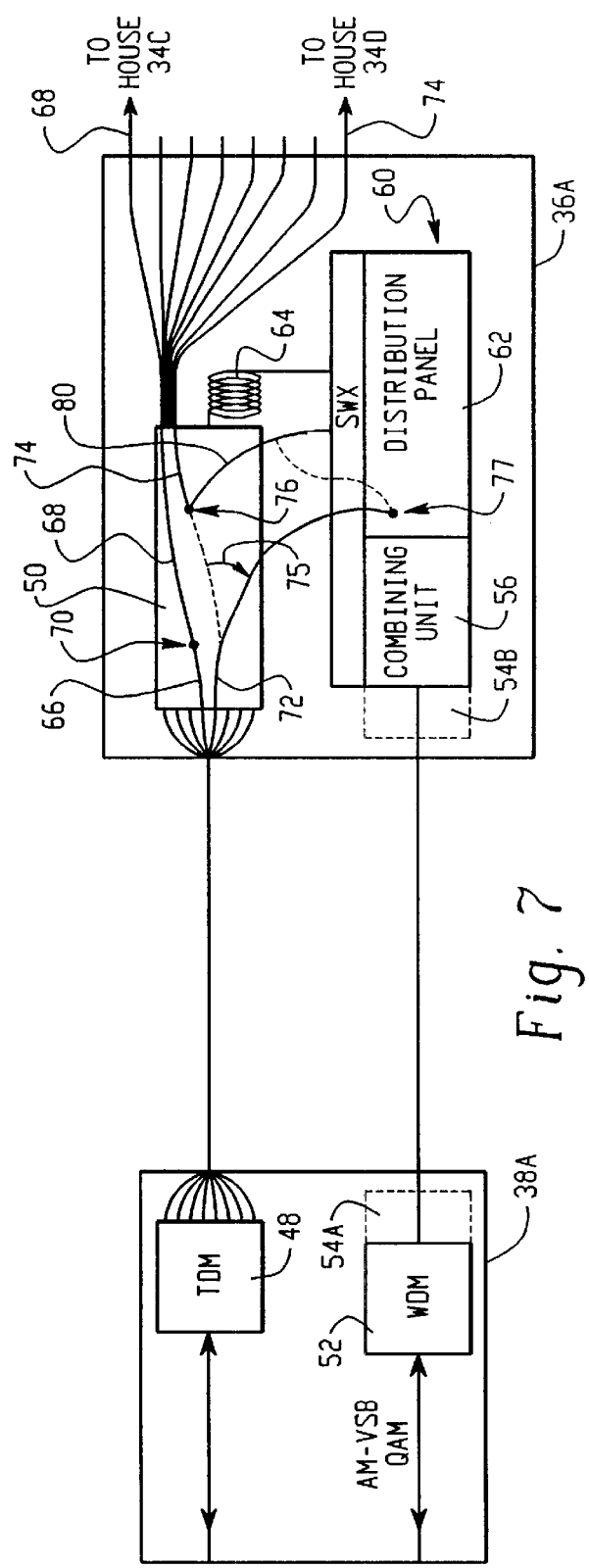
FIG. 7 is a schematic diagram of a portion of a portion of an FTTC (fiber-to-the-curb) communication system carrying information at the first frequency and also at a second frequency.
Figure 8A:
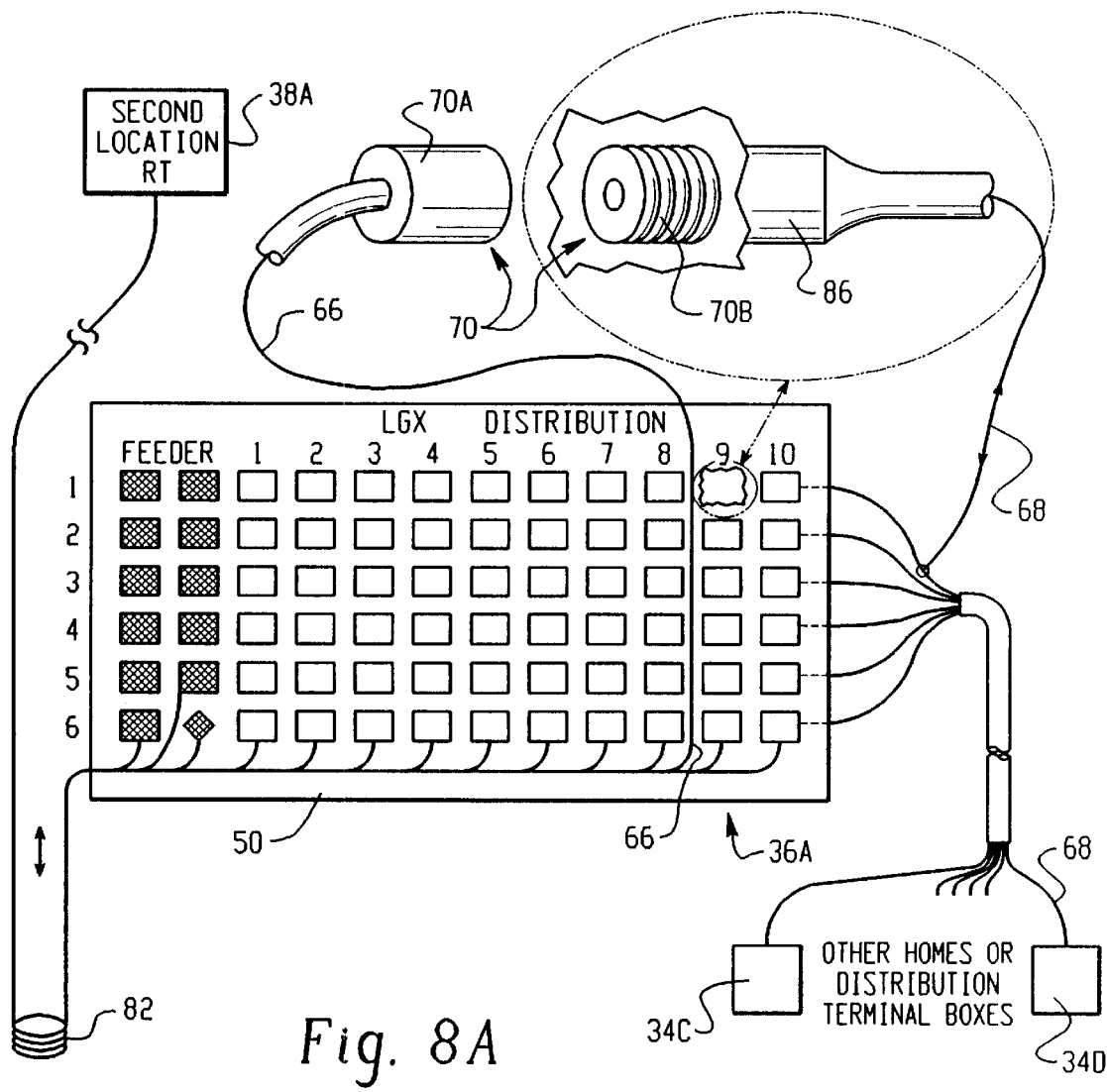
FIGS. 8–11 are diagrammatic illustrations of the techniques of the present invention for "upgrading" an existing one-frequency system to a two-frequency system at various stages of an installation.
Figure 8B:
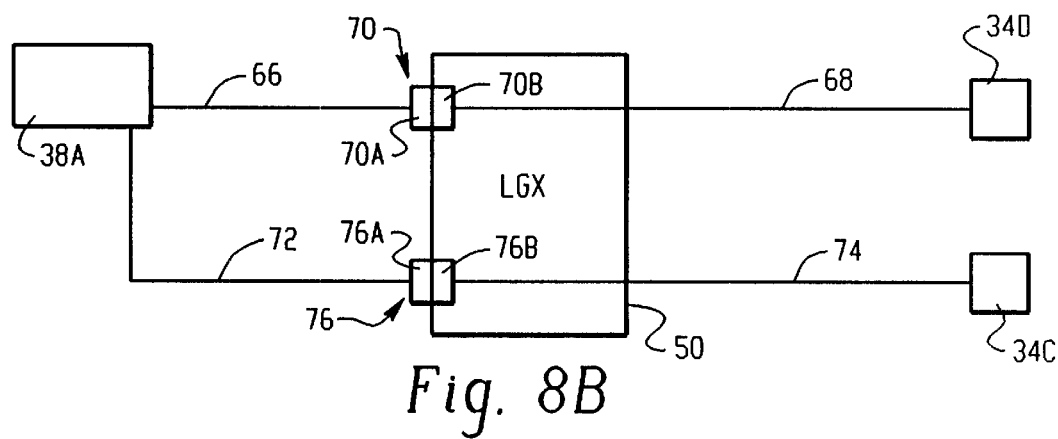

Referring to FIG. 7, there is shown an example of the upgraded system which now in addition to the TDM system described with respect to FIG. 6 also receives a fiber optical cable carrying AM-VSB (a multitude modulation-vestigial side band), and QAM (quadrature amplitude modulation) types of data. Although the added communication channel system is discussed with respect to only receiving data, that is, communications travel in only one direction from the central office to the individual homes, by using combining units or wave divisional multiplexers and demultiplexers, futuristic systems which may want to have communications in both directions at the frequency of 1550 MHZ would also be possible. However, in the system of FIG. 7, there is shown a WDM (wave division multiplexer) 52 connected to a splitter 54A which may be used to provide a multiplicity of individual fiber optics to the combining units 56 in the SWX (splitter with division multiplexing) apparatus 60 of distribution terminal box 36A. In a preferred embodiment, however, a single fiber optic is provided from RT 38A to a splitter 54B in distribution terminal 36A which, in turn, splits out the individual fibers before being provided to combining unit 56. Also included in the SWX apparatus 60 is a distribution panel 62 similar to the LGX distribution panel 50 also included in distribution terminal box 36A. To upgrade the system on demand from individual homes, it is only necessary to initially provide the SWX apparatus 60 and make individual connections between LGX distribution panel 50 and SWX distribution panel 62. Also as shown and will be understood in the following discussion is a loop of optical fibers 64, which loop is part of the SWX apparatus 60. In a preferred embodiment, this bundle of looped optical fibers 64 is mounted to the LGX panel 50 to aid in making the interconnections between LGX distribution panel 50 and the SWX distribution panel 62.

In a system which has an on-demand up grade, it will be appreciated that some of the homes will wish to obtain and pay for the upgrade, whereas other homes would not. Thus, referring again to FIG. 5, it is seen that home 34D has not chosen to purchase the upgrade, whereas 34C has. Thus, in the communication cable provided to home 34C, which does not choose to purchase the upgrade, it is seen that an individual fiber optic 66 coming from TDM 48 is connected to an individual cable 68 by means of a Readily Releasable Optical Connector 70. As seen, the individual cable 68 leads to home 34C. It should be understood that there are no connections between the SWX apparatus 60 to the LGX distribution panel 50 so as to bring in the second communication channel operating at 1550 MHZ to the individual optical fiber 68 going to home 34C.

Now, assuming that home 34D has decided to purchase the additional service and wishes to receive information on the communication channel operating at 1550 MHZ, it is seen that a cable 72 which originally connected to individual fiber 74 by means of Readily Releasable Optical Connector 76 in the same manner as optical fibers 66 and 68 as indicated by the dotted line, optical fiber 72 has been moved (arrow 75) is now connected to connector 77 on distribution panel 62 and individual optical fiber 80 which was originally connected to connector 77 is now connected to connector 76. By this simple disconnecting and reconnecting of optical fibers at two Readily Releasable Optical Connectors, upgrade on demand can be provided on an individual basis.

Referring now to FIGS. 8–11, there is shown diagrammatic illustrations of distribution terminal box 36A along with representative optical circuit schematics. FIG. 8A shows the distribution terminal box and FIG. 8B shows a representative optical schematic prior to any upgrade, and before the second communication channel operating at a frequency of 1550 is offered to the customers. As shown, a bundle of optical fibers is provided from the remote terminal 38A through a stress-relaxing loop 82 in distribution terminal box 36A. Individual fibers such as fiber 66 is optically coupled and terminates in a first half 70A of Readily Releasable Optical Connector, shown generically as 70, and, in turn, is coupled to its matching half 70B of Readily Releasable Optical Connector 70. Readily Releasable Optical Connector 70B is optically coupled to fiber-optic 68 and is provided to home 34D as a bidirectional 1310 MHZ communication channel. Similarly, prior to any up-graded service, cable 72 (FIG. 8B) goes through Readily Releasable Optical Connector 76 to fiber 74 which terminates at home 34C. To aid in understanding fiber 66 is the only individual fiber broken out and identified with a reference number. However, as shown leading from coil 82 is a bundle of fibers with branches shown going to each of the columns through 10. Each column branch of fibers then carries an individual fiber, such as fiber 66, to each of the connectors in the column.

Figure 9A:
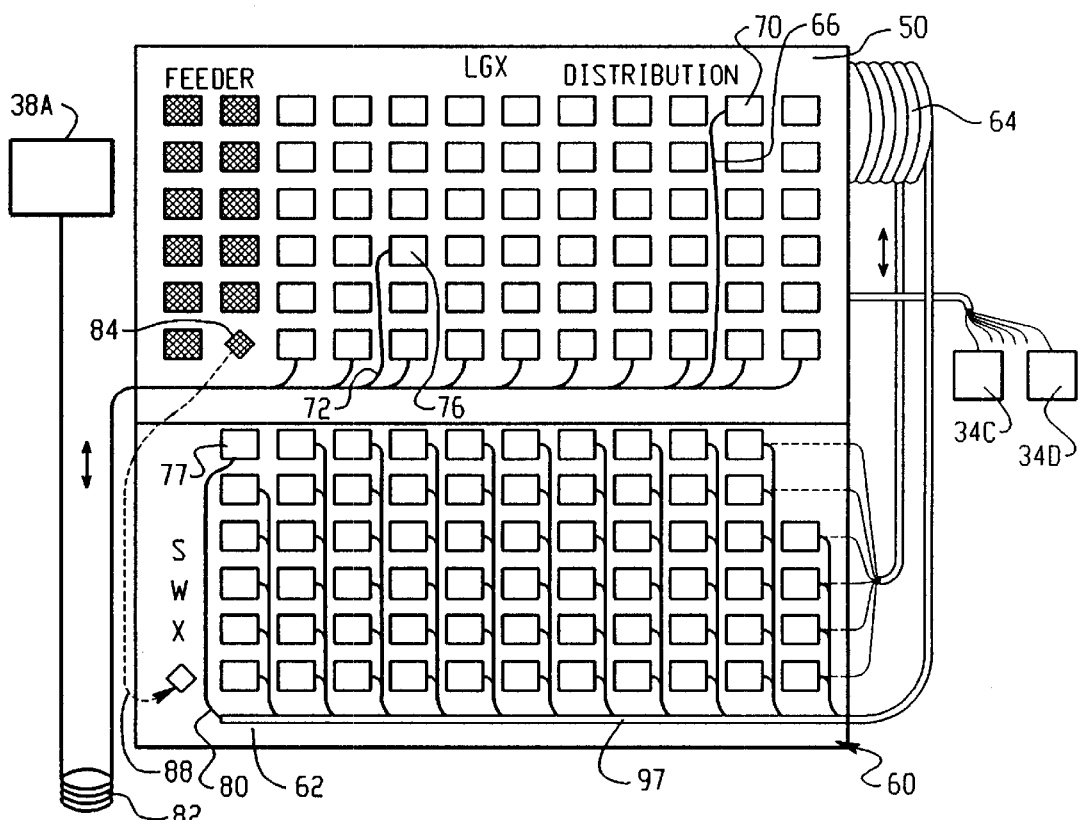
Figure 9B:
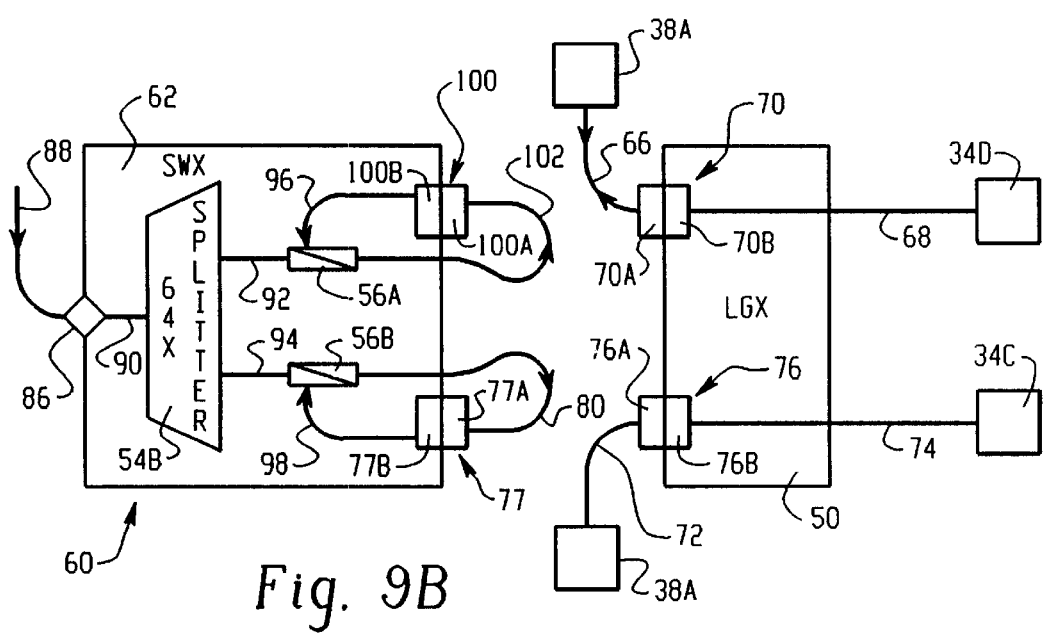
Figure 10A:
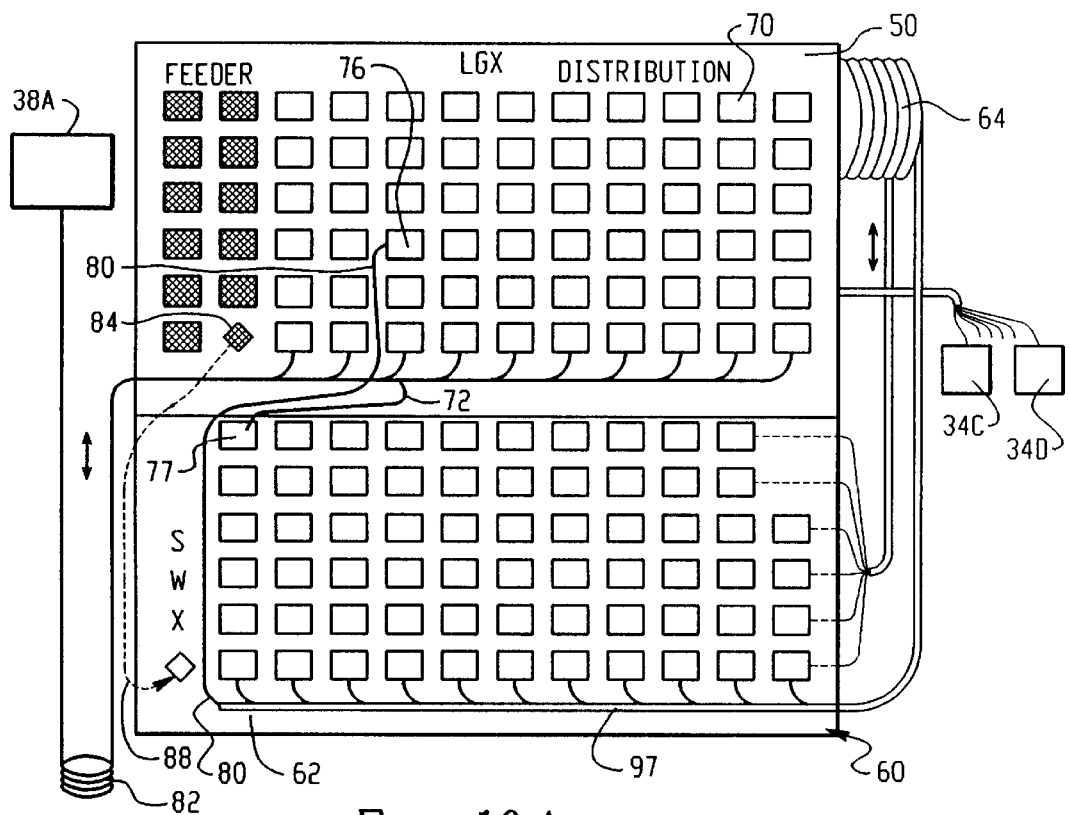
Figure 10B:
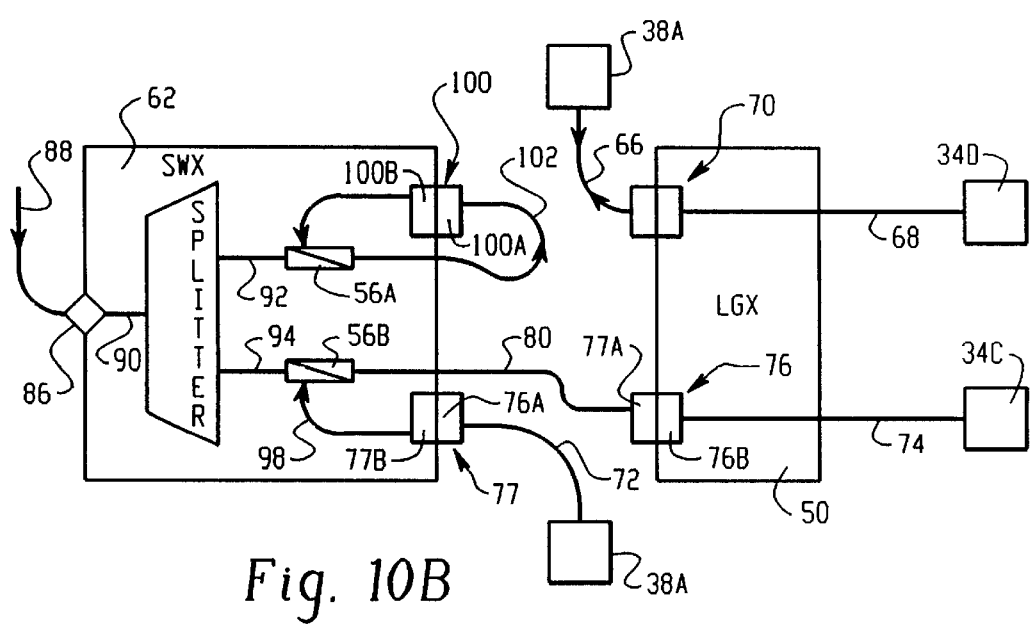

FIGS. 9A and 9B shows the SWX component 60 installed in distribution terminal box 36A and before any connections (i.e., prior to any request by a customer). As shown in the diagrammatic illustration FIG. 9A and the optic circuit schematic 9B, the only connection change is that the bundle of fiber optics from remote terminal 38A now includes a fiber optic carrying a second communication channel at 1550 MHZ In the illustrations of FIGS. 9A and 9B, the only connection to the LGX terminal 50 is the single fiber-optic cable 88 carrying the 1550 MHZ communication channel shown in dotted lines from fiber-optic terminal 84 on LGX distribution panel 50 to fiber-optic terminal 86 on distribution panel 62 of SWX apparatus 60. As shown, the SWX apparatus 60 has been added and the stress-relaxing loop 64 containing bundles of cables from SWX apparatus 60 has been conveniently attached to the LGX distribution panel 50 for easy connection and disconnection of individual optical fibers. In addition to the single optical fiber 88 carrying the 1550 MHZ communication channels from optical terminal 84 on LGX 50 to optical terminal 86 on SWX distribution panel 62, it is seen that a single optical fiber 90 leads from terminal 86 to 64X splitter 54B. Two of the outputs of splitter 54B go to optical combining units 56A and 56B. As shown, before any of the customers request service, combining units 56A and 56B receive an output of a single optical fiber such as optical fibers 92 and 94 from the splitter 54B. Optical combining units 56A and 56B also receive an input on an optical fiber such as 96 and 98 from Readily Releasable Optical Connectors 77 and 100. Each of the optical combining units 56, such as, for example, 56A and 56B, also provide an output, such as shown by optical fibers 80 and 102 which are optically coupled and terminate in Readily Releasable Optical Connectors 77A and 100A, respectively. As was discussed with respect to FIG. 8A, although fiber 88 going to terminal or connector 77 is the only individual fiber broken out and identified with a reference number, each of the connectors on distribution panel 62 has an individual fiber leading from the bundle of fibers 97 connecting to it. Thus, it is seen that prior to any request of 1550 MHZ service by a customer, the outputs of each combining unit is looped back on itself as an input. Thus, any light pulses traveling through fiber-optic 90 through splitter 54B and to the individual combining units 56A and 56B will travel and be dissipated in a closed loop. This is extremely important since, if the outputs of the combining units were left free, it would be necessary to provide individual nonreflecting termination caps to prevent very deleterious reflections from occurring and traveling back through the system. Thus, by using the Readily Releasable Optical Connectors in this manner, i.e., each combining unit returning its output signal back on itself, the cost and expense of providing individual termination caps to prevent reflection as well as the labor costs of continually installing and removing such caps is avoided.

Now by receiving a request by the home 34C for additional communication service, a communications employee only needs to go to the distribution terminal 36A, disconnect two plugs, swap their leads, button up the box, and return to the office. As is more clearly shown in the optic schematic diagram of FIG. 10, no changes need to be made with the fiber-optic connections for the customer at home 34D. However, for the customer 34C who requested additional service of the 1550 MHZ communication channel, it is only necessary to disconnect optical fiber 72 which terminates in Readily Releasable Optical Connector 76A from connector 76B mounted to the LGX distribution panel 50 and to disconnect optical fiber 80 from combining unit 56B and which terminates in Readily Releasable Optical Connector 77A from its matching connector 77B mounted to the SWX distribution panel 62. Readily Releasable Optical Connector 77A optically coupled to optical fiber 80 is then reconnected to the matching Readily Releasable Optical Connector 76B and Readily Releasable Optical Connector 76A connected to optical fiber 72 is reconnected to Readily Releasable Optical Connector 77B on the SWX distribution panel 62. It can now be seen that by these two simple connections and disconnections the communication channel operating at 1310 MHZ is provided through optical fiber 72 through connections 76A/77B to the combining unit 56B, which is also receiving, by means of optical fiber 94, a communication channel operating at 1550 MHZ. The output of combining unit 56B, which now contains operating channels operating at both 1310 and 1550 MHZ, is carried by fiber-optic 80 to home 34C by means of connector 77A/76B through optical fiber 74. As discussed above in the embodiment shown, communication channel operating at 1310 MHZ is bidirectional, whereas the communication channel operating at 1550 MHZ is shown as being unidirectional from its source to the home 34C. However, as will be appreciated by those skilled in the art, by multiplexing and the use of bidirectional combining units, the communication channel operating at 1550 MHZ could also operate as a WDM bidirectional system. As additional customers request the new 1550 MHZ service, the procedure is simply repeated as the requests come into the office.

Figure 11A:
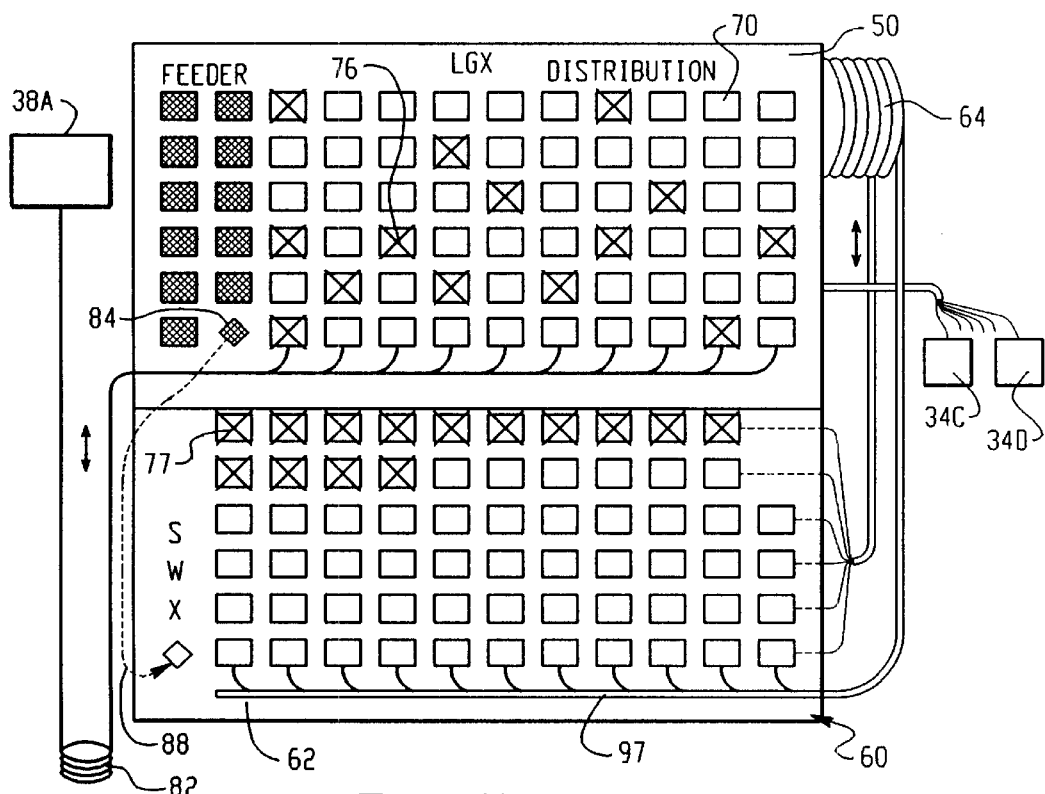
Figure 11B:
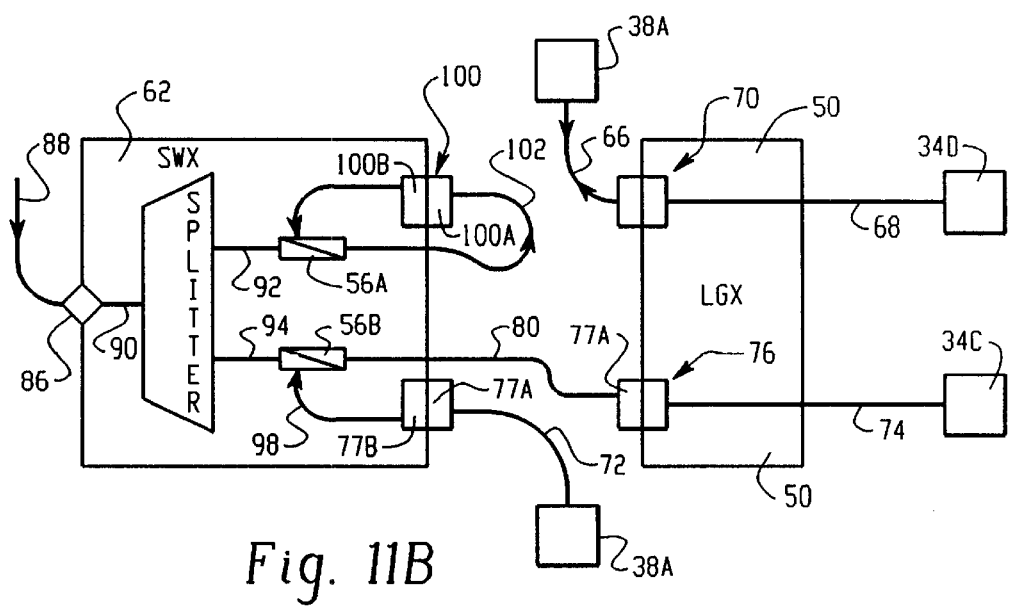

FIG. 11 illustrates such an on-demand upgrade by showing fourteen of the random terminals on the LGX box 50, which are indicated by an X through the box, as now having the 1310 service and the upgraded 1550 MHZ service. It will be possible to use a connector or distribution panel 62 which has substantially the same location as the random terminals at panel 50 for each connector. Alternately, however, as shown, the connectors on panel 62 can be selected on an orderly basis as the requests for new service come in.

Thus, it will be appreciated that there are now has been described methods and apparatus for readily upgrading service to individual customers on a demand basis.

The corresponding structures, materials, acts, and equivalents of all means or step plus function elements in the claims below are intended to include any structure, material, or act for performing the function in combination with other claimed elements as specifically claimed.

I claim:

1. An optical fiber distribution terminal for providing fiber optic service at a first wavelength and a second wavelength to a subscriber, the distribution terminal comprising:

a first distribution panel comprising a first fiber optic connector coupled to a first fiber optic output line operable to provide fiber optic service at a first wavelength and a second wavelength to a subscriber;

a second distribution panel comprising a combining unit, the combining unit having a first combining input, a second combining input, and a second fiber optic output line, the first combining input for receiving data at the first wavelength and connected to a second fiber optic connector, the second combining input for receiving data at the second wavelength, and the combining unit being operable to output the data at the first and second wavelengths on the second fiber optic output line; and a first fiber optic input line for carrying data at the first wavelength.

2. The distribution terminal of claim 1, wherein data at the first wavelength is provided to the subscriber by connecting the first fiber optic input line to the first fiber optic connector, and data at the first wavelength and the second wavelength is provided to the subscriber by connecting the first fiber optic input line to the second fiber optic connector and connecting the second fiber optic output line to the first fiber optic connector.

3. The distribution terminal of claim 1, wherein:
the first distribution panel further comprises a plurality of first fiber optic connectors coupled to a corresponding plurality of first fiber optic output lines operable to provide fiber optic service at a first wavelength and a second wavelength to a subscriber;
the second distribution panel further comprises a plurality of combining units, each combining unit having a first combining input, a second combining input, and a second fiber optic output line, the first combining input for receiving data at the first wavelength and connected to a corresponding second fiber optic connector, the second combining input for receiving data at the second wavelength; and
a plurality of first fiber optic input lines.

4. The distribution terminal of claim 3, wherein data at the first wavelength is provided to a first subscriber by connected a first fiber optic input line to a first fiber optic connector coupled to a corresponding first fiber optic output line operable to provide fiber optic service to the first subscriber, and data at the first wavelength and the second wavelength is provided to a second subscriber by connecting a first fiber optic input line to the corresponding second fiber optic connector of a combining unit and connecting the second fiber optic output line of the combining unit to a first fiber optic connector coupled to a corresponding first fiber optic output line operable to provide fiber optic service to the second subscriber.

5. The distribution terminal of claim 4, wherein the fiber optic connectors are readily releasable optical connectors.

6. The apparatus of claim 5, wherein the first wavelength is 1310 nanometers and the second wavelength is 1550 nanometers.

7. The distribution terminal of claim 4, further comprising a splitter having a splitter input and a plurality of splitter outputs, each splitter output corresponding to and coupled to a second combining unit input, the splitter input for receiving a third fiber optic input line carrying data at the second wavelength, the splitter operable to transmit the data at the second wavelength on each splitter output.

8. The distribution terminal of claim 7, wherein the splitter performs wavelength division multiplexing to transmit the data at the second wavelength on each splitter output.

9. The distribution terminal of claim 7, wherein data at the second wavelength only flows in the direction from the distribution terminal to the subscriber.

10. The distribution terminal of claim 7, wherein the data at the first wavelength is transmitted in a ping-pong half duplex system.

11. The apparatus of claim 3, wherein the second fiber optic output lines not connected to first fiber optic connectors are coupled to nonreflecting termination caps.

12. The apparatus of claim 3, wherein second fiber optic output lines not connected to first fiber optic connectors are coupled to the second fiber optic connector of corresponding combining units.

13. A method of providing service upgrades to fiber optic service subscribers, the method comprising the steps of:
providing first fiber optic service channels at a first wavelength from a distribution terminal;
providing second fiber optic service channels at a second wavelength from a distribution terminal;
providing the first fiber optic service channels from the distribution terminal over first fiber optic lines to each subscriber;
receiving an upgrade request from a requesting subscriber;
combining at the distribution terminal the first fiber optic service channel and the second fiber optic service channel for the requesting subscriber; and
providing the first fiber optic service channel and the second fiber optic service channel over the first fiber optic line to the requesting subscriber.

14. The method of claim 13, wherein the steps of providing first fiber optic service channels at a first wavelength from a distribution terminal and providing second fiber optic service channels at a second wavelength from a distribution terminal comprise the steps of:
providing the first fiber optic service channels to a first distribution panel;
providing the first fiber optic lines from the first distribution panel to each subscriber; and
providing the second fiber optic service channels to combining units in a second distribution panel.

15. The method of claim 14, wherein the step of combining at the distribution terminal the first fiber optic service channel and the second fiber optic service channel comprises the steps of:
removing the first fiber optic service channel for the requesting subscriber from the first distribution panel;
providing the first fiber optic service channel for the requesting subscriber to a combining unit for the requesting subscriber;
combining the first fiber optic service channel for the requesting subscriber and the second fiber optic service channel in the combining unit for the requested subscriber;
providing the first fiber optic service channel for the requesting subscriber and the second fiber optic service channel combined in the combining unit to the first fiber optic line for the requested subscriber.

* * * * *